(12) United States Patent
Suzuki et al.

(10) Patent No.: US 11,664,050 B2
(45) Date of Patent: May 30, 2023

(54) TUNED EDGE PROFILE OF A DISK SUBSTRATE FOR USE IN MAGNETIC RECORDING MEDIA

(71) Applicant: Western Digital Technologies, Inc., San Jose, CA (US)

(72) Inventors: Shoji Suzuki, San Jose, CA (US); Kirk B. Cheng, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/543,441

(22) Filed: Dec. 6, 2021

(65) Prior Publication Data
US 2023/0104944 A1 Apr. 6, 2023

Related U.S. Application Data

(60) Provisional application No. 63/252,272, filed on Oct. 5, 2021.

(51) Int. Cl.
*G11B 5/84* (2006.01)
*G11B 23/00* (2006.01)
*G11B 5/82* (2006.01)

(52) U.S. Cl.
CPC .............. *G11B 5/8404* (2013.01); *G11B 5/82* (2013.01); *G11B 23/0021* (2013.01)

(58) Field of Classification Search
None
See application file for complete search history.

(56) References Cited

U.S. PATENT DOCUMENTS 6,246,544 B1 * 6/2001 Tagami .............. G11B 5/73921
6,521,862 B1 2/2003 Brannon
(Continued)

FOREIGN PATENT DOCUMENTS

| JP | 2004079009 A | 3/2004 |
| WO | 2001056708 A1 | 8/2001 |
| WO | 2005096275 A1 | 10/2005 |

OTHER PUBLICATIONS

Canon Anelva Corporation, "Disk PVD Equipment ML3000 Series"; accessed on Mar. 8, 2021; https://www.canon-anelva.co.jp/english/products/storage/st_detail01.html; 2 pages.
(Continued)

*Primary Examiner* — William J Klimowicz
(74) *Attorney, Agent, or Firm* — Loza & Loza, LLP; Gabriel Fitch

(57) ABSTRACT

A disk for a magnetic recording apparatus is described. The disk includes a first surface extending along a first plane, a second surface extending along a second plane parallel to the first plane, and a disk thickness between the first surface and the second surface, measured along a first direction substantially normal to the first surface. The disk further includes an edge surface disposed along a perimeter of the disk and between the first surface and the second surface, where the edge surface extends along a third plane substantially perpendicular to the first surface, a first chamfer disposed between the first surface and the edge surface, and a second chamfer disposed between the second surface and the edge surface. In an aspect, a length of the edge surface measured along the first direction may be between 40% and 80% of the disk thickness.

36 Claims, 10 Drawing Sheets

(56) References Cited

U.S. PATENT DOCUMENTS

| | | | | |
|---|---|---|---|---|
| 6,843,892 | B1* | 1/2005 | McLeod | C23C 14/50 |
| | | | | 156/345.31 |
| 10,553,243 | B2 | 2/2020 | Tamaki | |
| 2002/0197437 | A1* | 12/2002 | Hashimoto | G11B 5/73921 |
| | | | | 428/848.6 |
| 2003/0210498 | A1* | 11/2003 | Kim | G11B 5/82 |
| 2006/0154111 | A1 | 7/2006 | Horigome et al. | |
| 2013/0122265 | A1* | 5/2013 | Miyamoto | G01N 21/95 |
| | | | | 428/192 |
| 2014/0340790 | A1* | 11/2014 | Adachi | G11B 5/73921 |
| | | | | 428/848.7 |
| 2016/0280590 | A1 | 9/2016 | Kashima et al. | |
| 2017/0334773 | A1* | 11/2017 | Katayama | B32B 7/06 |
| 2019/0221233 | A1 | 7/2019 | Takahashi et al. | |
| 2020/0278541 | A1* | 9/2020 | Kim | C03C 3/085 |

OTHER PUBLICATIONS

Intevac, "Thin Film Equipment"; accessed on Mar. 8, 2021; https://www.intevac.com/thin-film/; 7 pages.

Semicore, "PVD Coating Systems, Magnetron Sputtering, Thin film Deposition, Thermal Evaporation, Sputtering Equipment, Vacuum Engineering"; Semicore Equipment, Inc., accessed on Mar. 8, 2021; http://www.semicore.com/; 3 pages.

Hughes, Matt "What is Sputtering? Magnetron Sputtering?"; Semicore Equipment, Inc., accessed on Mar. 8, 2021; http://www.semicore.com/what-is-sputtering; 4 pages.

* cited by examiner

TUNED EDGE PROFILE OF A DISK SUBSTRATE FOR USE IN MAGNETIC RECORDING MEDIA

CROSS-REFERENCE TO RELATED APPLICATIONS

This application claims priority to and the benefit of Provisional Patent Application No. 63/252,272 entitled "TUNED EDGE PROFILE FOR GLASS SUBSTRATES FOR USE WITH MAGNETIC RECORDING MEDIA" and filed in the United States Patent & Trademark Office on Oct. 5, 2021, the entire content of which is incorporated herein by reference as if fully set forth below in its entirety and for all applicable purposes.

FIELD

The present disclosure relates to a magnetic recording disks and methods for fabrication of such disks, and more particularly to an edge profile of a disk substrate for use in magnetic recording in hard disk drive (HDD) recording apparatuses.

INTRODUCTION

Magnetic storage systems, such as a hard disk drive (HDD), are utilized in a wide variety of devices in both stationary and mobile computing environments. Examples of devices that incorporate magnetic storage systems include desktop computers, portable notebook computers, portable hard disk drives, digital versatile disc (DVD) players, high-definition television (HDTV) receivers, vehicle control systems, cellular or mobile telephones, television set top boxes, digital cameras, digital video cameras, video game consoles, and portable media players.

A typical disk drive includes magnetic storage media in the form of one or more flat disks or platters. The disks are generally formed of two main substances, namely, a substrate material that gives it structure and rigidity, and a magnetic media coating that holds the magnetic impulses or moments that represent data in a recording layer within the coating. The typical disk drive also includes a read head and a write head, generally in the form of a magnetic transducer which can sense and/or change the magnetic fields stored on the recording layer of the disk. When magnetic storage media uses a non-conductive substrate (such as a glass substrate and/or glass ceramic substrate), a conductive pre-seed layer may be deposited on the non-conductive substrate so that a bias voltage can be applied during the deposition of some or all of the subsequent media films to form the magnetic storage media. The pre-seed layer should have sufficient electrical conductance to facilitate the deposition processes.

As noted above, a magnetic storage device may employ a disk with a conductive layer and a magnetic recording layer. During a fabrication process of the disk, the conductive layer is deposited on a disk substrate that is electrically non-conductive. The disk may be supported by pins during the fabrication process. In particular, the disk may be supported by the pins at outer diameter (OD) edge portions of the disk. After the deposition of the conductive layer, a sputtering process may be performed to sputter the magnetic recording layer on the disk substrate while the disk is supported by the pins. In an aspect, the pins may establish electrical contact with the conductive layer of the OD edge portions of the disk after the deposition of the conductive layer. For example, the pins may apply a bias voltage for the sputtering process after the deposition of the conductive layer. At the contact points between the pins and the OD edge portions of the disk, chipping and arcing may occur if the electrical contact is poor. Therefore, it would be helpful to improve the design of the disk to reduce a chance of chipping and arcing.

SUMMARY

In one aspect, a disk for a magnetic recording apparatus is provided. The disk includes a first surface extending along a first plane, a second surface extending along a second plane parallel to the first plane, and a disk thickness between the first surface and the second surface, measured along a first direction substantially normal to the first surface. The disk further includes an edge surface disposed along a perimeter of the disk and between the first surface and the second surface, where the edge surface extends along a third plane substantially perpendicular to the first surface, a first chamfer disposed between the first surface and the edge surface, and a second chamfer disposed between the second surface and the edge surface. In an aspect, a length of the edge surface measured along the first direction may be between 40% and 80% of the disk thickness.

In another aspect, a deposition apparatus is provided. The deposition apparatus includes the disk, one or more contact pins having an electrical contact with the edge surface of the disk, and a bias voltage power supply configured to apply a voltage to the one or more contact pins during a deposition process for depositing one or more layers on the disk.

In another aspect, a data storage device is provided. The data storage device includes the disk, the disk further comprising a magnetic recording layer. The data storage device further includes a slider comprising a magnetic head, where the slider is configured to write information to the magnetic recording layer of the disk.

In yet another aspect, a method of fabricating a disk for a magnetic recording apparatus is provided. The method includes providing a disk comprising an annulus shape and comprising a first surface extending along a first plane, a second surface extending along a second plane parallel to the first plane, and a disk thickness between the first surface and the second surface, measured along a first direction substantially normal to the first surface. The method further includes removing material from a first perimeter corner of the disk to form a first chamfer, and removing material from a second perimeter corner of the disk to form a second chamfer and an edge surface disposed between the first chamfer and the second chamfer, wherein the edge surface is disposed and between the first surface and the second surface, wherein the edge surface extends along a third plane substantially perpendicular to the first surface, wherein a length of the edge surface measured along the first direction is between 40% and 80% of the disk thickness.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

Figure 1:
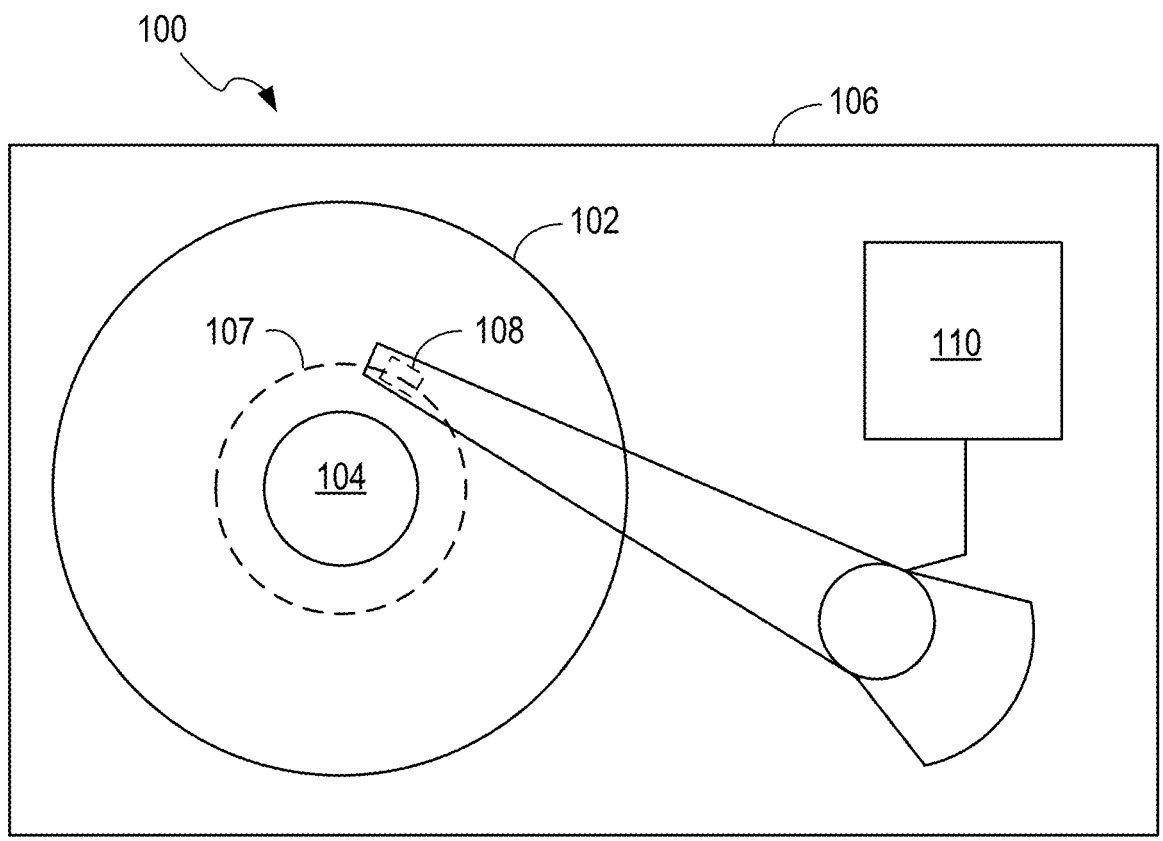
FIG. 1 illustrates a top plan view of a disk drive in accordance with an embodiment of the disclosure.

FIG. 1 is a top schematic view of a disk drive 100 configured for magnetic recording and including a magnetic recording medium 102 having pre-stressed disks in accordance aspects of the disclosure. In illustrative examples, the magnetic recording medium 102 includes a perpendicular magnetic recording (PMR) medium. However, other recording media, such shingle-written magnetic recording (SMR) media, heat assisted magnetic recording (HAMR) or microwave assisted magnetic recording (MAMR) media may be used in other examples. Disk drive 100 may include one or more disks/media 102 to store data. Disk/media 102 resides on a spindle assembly 104 that is mounted to drive housing 106. Data may be stored along tracks 107 in the magnetic recording layer of disk 102. The reading and writing of data are accomplished with the head/slider 108 that may have both read and write elements. The write element is used to alter the properties of the magnetic recording layer of disk 102 and thereby write information thereto. In one embodiment, recording head 108 may have magneto-resistive (MR), or giant magneto-resistive (GMR) elements, such as tunnel magneto-resistive (TMR) elements for reading, and a write pole with coils that can be energized for writing. In another embodiment, head 108 may be another type of head, for example, an inductive read/write head or a Hall effect head. In operation, a spindle motor (not shown) rotates the spindle assembly 104, and thereby rotates disk 102 to position head 108 at a particular location along a desired disk track 107. The position of the head 108 relative to the disk 102 may be controlled by position control circuitry 110.

Figure 2:
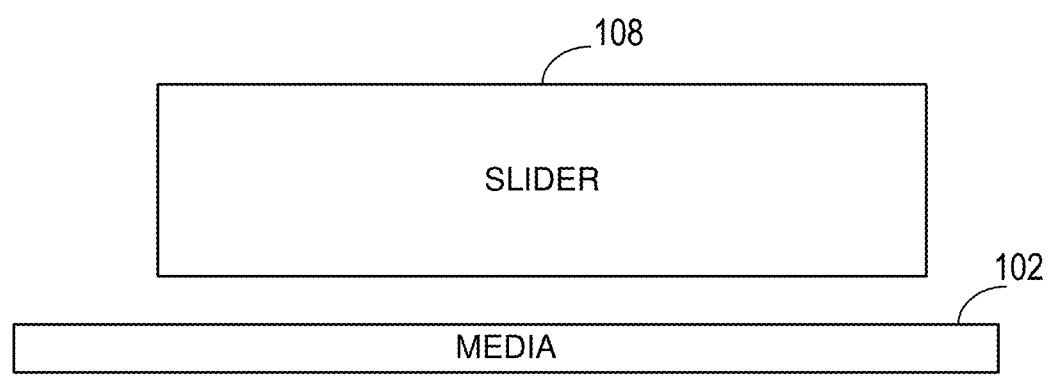
FIG. 2 illustrates a profile view of a slider and a disk in accordance with an embodiment of the disclosure.

FIG. 2 is a side cross sectional schematic view of selected components of the magnetic recording system of FIG. 1 including the magnetic recording medium 102 with pre-stressed disk in accordance with aspects of the disclosure. The head/slider 108 is positioned above the medium 102. The head/slider 108 includes a write element and a read element (not shown) positioned along an air bearing surface (ABS) of the slider (e.g., bottom surface) for writing information to, and reading information from, respectively, the medium 102. FIGS. 1 and 2 illustrate a specific example of a magnetic recording system. In other examples, embodiments of the improved media can be used in other suitable magnetic recording systems (e.g., such as CMR, HAMR, and MAMR recording systems). For simplicity of description the various embodiments are primarily described in the context of an exemplary HDD magnetic recording system.

In some aspects, during a media manufacturing process of a magnetic recording medium, a deposition assembly (e.g., sputter assembly) may use a carrier that has pins to support a substrate while various layers to support magnetic recording (e.g., such as magnetic layers and protective layers such as carbon) are sputtered on the substrate. For example, the pins of the carrier may support a disk substrate at an outer diameter (OD) perimeter of the disk substrate so that the data recording surface(s) of the disk substrate are free or substantially free of any obstruction during the deposition of the magnetic layers and the protective layer(s).

In some cases, the disk substrate may be made of a nonconductive material such as glass or other suitable nonconductive materials (e.g., glass ceramic). In this case, a conductive layer that is electrically conductive may be applied on the disk substrate at the beginning of the sputtering process. The conductive layer may also function as an adhesion layer. For example, the conductive layer may be a metal layer that provides electrical conductivity on the nonconductive disk substrate surface. After depositing the conductive layer, the magnetic layer structure, including various intervening layers, the magnetic recording layer and a protective layer may be sputtered on the disk substrate, to form a disk configured for magnetic recording.

The sputtering process to sputter layers on the disk substrate may involve applying bias voltage between a disk and a cathode, where the current may flow to a surface of the disk substrate through the pins. In an example, to deposit various layers in the magnetic layer structure, such as the magnetic layers and the protective layer, a bias condition may be implemented by applying a negative potential to the disk substrate surface and a positive potential to a target surface. In an example, the bias condition may also be used to ion-etch the disk surfaces prior to depositing the magnetic layer on the conductive layer. In this example, the bias condition during the ion-etching may control the roughness of the conductive layer deposited on the nonconductive material of the disk substrate. A smooth surface of the conductive layer may be needed to deposit a magnetic layer in an optimal manner. Multiple pins may be used to maintain sufficient electrical contact to apply the bias condition. In one aspect, various layers of the magnetic layer structure may be ion-etched, and the bias condition may be applied for ion-etch of one or more of these layers as well.

At the contact points between the pins and the disk substrate, damage to the disk, such as OD chipping and arcing, may occur if the electrical contact condition is poor. For example, a poor electrical contact may cause the bias voltage to change, and a sudden/drastic change in the bias voltage may cause arcing, which may generate a high temperature at the contact point that melts a portion of the disk substrate at the contact point. This may physically destroy the disk, or the melted portion of the disk substrate may create other problems (e.g., other damage) for the disk. If the arcing is severe, the severe arcing may cause the disk substrate to be chipped and/or may cause the disk substrate to be dislodged from the carrier (e.g., by being freed from the pins). Further, because arcing is caused by extremely high temperature, molten metal of the layers and/or droplets of melted substrate materials may contaminate the data surfaces of the disk. Chipping due to mechanical contacts can be prevented by adjusting the contact condition between an OD edge surface of an OD edge and pins. However, even after adjusting the contact condition to improve the mechanical contacts between the OD edge surface and the pins, arcing may still occur because the arcing is an electrical phenomenon, e.g., caused by a sudden/drastic change in the bias voltage. For example, the arcing may occur during the sputtering process to deposit various layers such as the magnetic layer and the protective layer and/or during the ion-etching process prior to depositing the magnetic layer.

Figure 3:
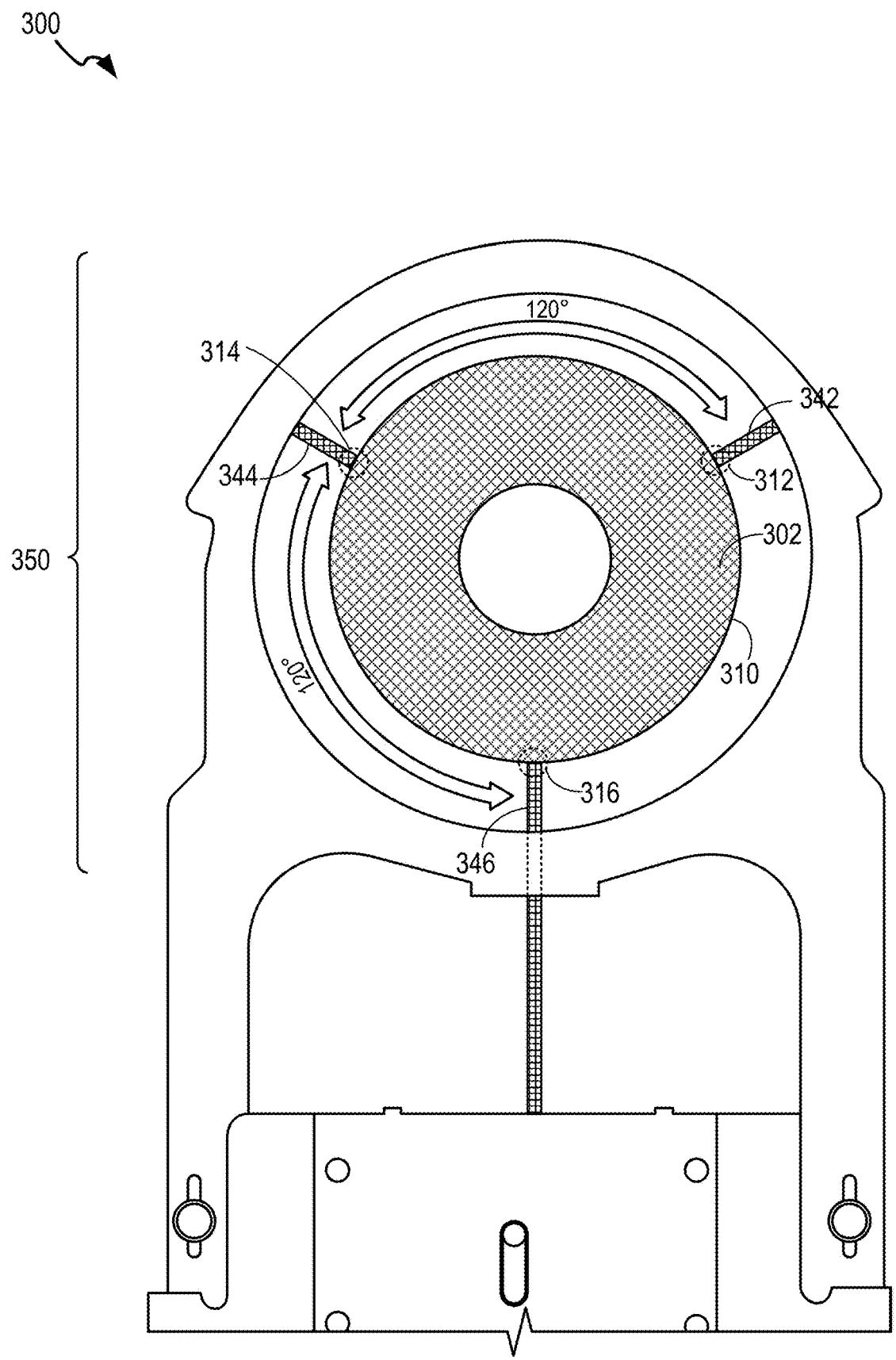
FIG. 3 is a front schematic view of an exemplary disk carrier with pins used in a magnetic media manufacturing process in accordance with aspects of the disclosure.

FIG. 3 is a front schematic view of an exemplary disk carrier 300 with pins used in a media manufacturing process in accordance with aspects of the disclosure. As shown in FIG. 3, a disk substrate 302 may be supported at an OD edge 310 of the disk substrate 302 by three pins, including a first pin 342, a second pin 344, and a third pin 346, of a carrier panel 350 of the disk carrier 300. In particular, the first pin 342 contacts a first edge surface portion 312 of the OD edge 310, the second pin 344 contacts a second edge surface portion 314 of the OD edge 304, and the third pin 346 contacts a third edge surface portion 316 of the OD edge 304. The first pin 342, the second pin 344, and the third pin 346 may be spaced out evenly around a perimeter of the disk substrate 302 corresponding to the OD edge 310. For example, the first pin 342 and the second pin 344 may be 120 degrees apart from each other, the second pin 344 and the third pin 346 may be 120 degrees apart from each other, and the third pin 346 and the first pin 342 may be 120 degrees apart from each other. The first pin 342, the second pin 344, and/or the third pin 346 may make electrical contacts with the first edge surface portion 312, the second edge surface portion 314, and/or the third edge surface portion 316, respectively, to apply a bias voltage to the disk substrate 302 during a sputtering process. Although FIG. 3 shows the disk carrier 300 having three pins, a number of pins implemented in the disk carrier 300 is not limited to three. For example, more than three pins may be implemented by a disk carrier in another embodiment.

Figures 4A, 4B:
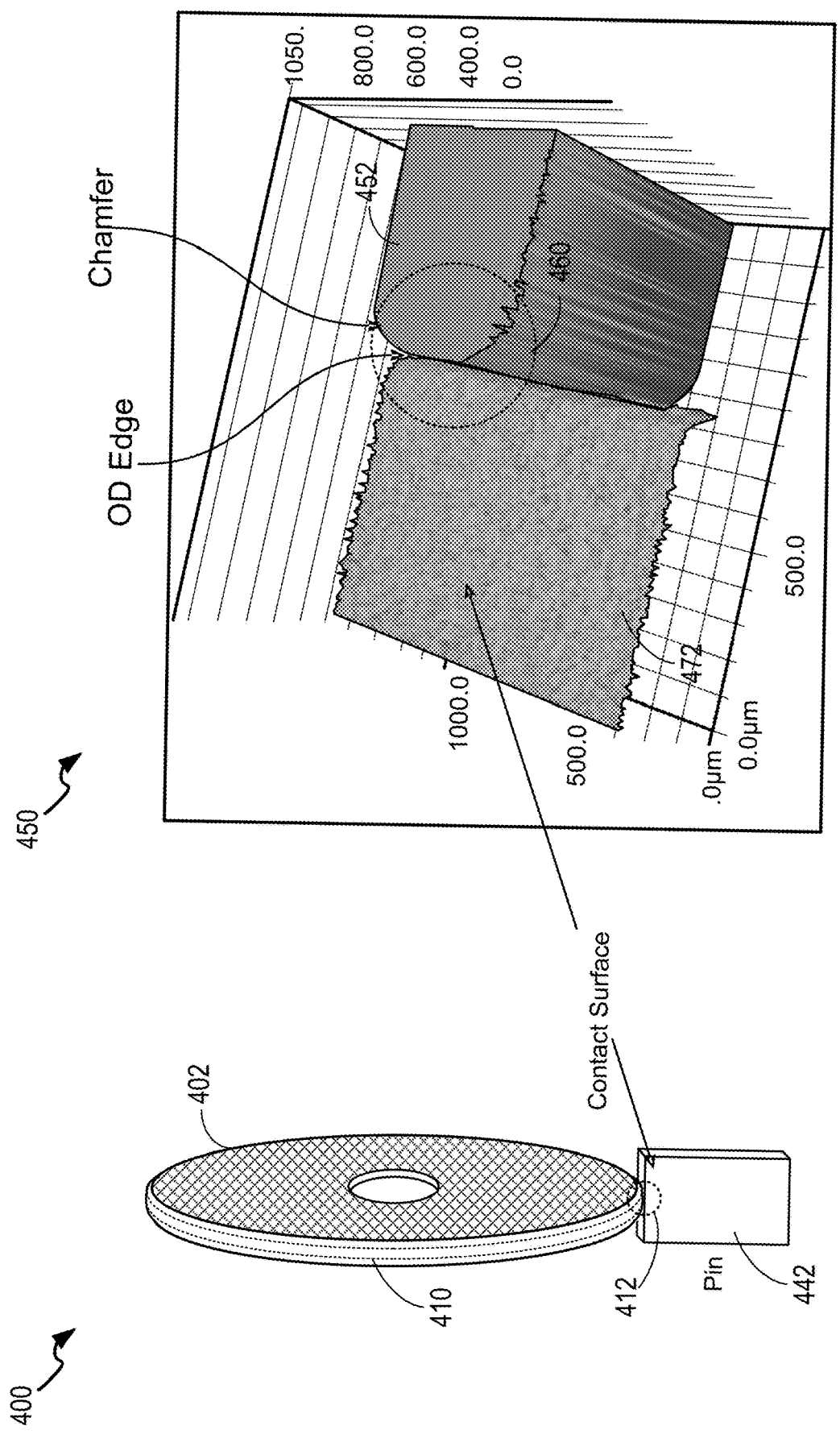
FIG. 4A is a perspective schematic view of a disk in contact with a pin used in a magnetic media manufacturing process in accordance with aspects of the disclosure.
FIG. 4B is a magnified view of the pin and the outside diameter (OD) edge around the edge surface in accordance with aspects of the disclosure.

FIG. 4A is a perspective schematic view 400 of a disk 402 in contact with a pin 442 used in a media manufacturing process in accordance with aspects of the disclosure. As discussed above, a disk substrate 402 may be supported at an OD edge 410 of the disk substrate 402 by one or more pins. For simplicity, FIG. 4A shows one pin 442 contacting the OD edge 410 at an edge surface portion 412 of the OD edge 410. For example, the disk substrate 402, the OD edge 410, and the pin 442 may respectively correspond to the disk substrate 302, the OD edge 310, and the first pin 342 of FIG. 3. As shown in FIG. 4A, the OD edge 410 is supported by a narrow flat contact surface of the pin 442 at the edge surface portion 412.

FIG. 4B is a magnified view 450 of the pin 442 and the OD edge 410 around the edge surface portion 412 in accordance with aspects of the disclosure. For example, the magnified view 450 may be similar to an image captured by a scanning electron or laser microscope. A magnified portion 472 of the pin 442 shows that the pin 442 does not have a smooth flat surface, but instead has a rough surface with irregularities. A magnified portion 460 of the OD edge 410 also shows that the OD edge 410 does not have a smooth flat surface.

Smooth flat surfaces for a pin in the disk carrier and the OD edge are desired in order to achieve an optimal electrical contact between the pin and the OD edge of the disk substrate. However, the pin's contact surface and the OD edge may not have smooth flat surfaces. The rough surfaces on the pin and the OD edge may be due to the sputtering process that also deposits layers on the pin as well as due to sandblasting on pins and edge polishing on a substrate. Such irregularities on the surfaces at the contact point due to the roughness may cause arcing and/or chipping.

A contact resistance is an electrical resistance at the contact point of the pin's contact surface and the OD edge, and a contact force is a force applied when the pin's contact surface contacts the OD edge. The contact resistance is inversely proportional to the contact force. The relationship between the contact force and the contact resistance is expressed by the following equation.

$$\text{Resistance} \propto \text{Force}^{-m} \qquad \text{Equation (1)}$$

where m denotes the contact condition. For example, m is 0.5 for a contact between two spherical/convex surfaces and m is 0.6 if the contact is between a spherical/convex surface and a flat surface. Equation (1) takes into account a contact resistance of surfaces with certain roughness. The resistance is high if the force is small, and the resistance is small if the force is high, according to Equation (1). Hence, as the contact force increases, the contact resistance decreases. This phenomenon is observed at a contact portion between a sputter pin and an OD edge surface of an OD edge. Based on this relationship, if the contact area of the sputter pin and the OD edge surface is large, the contact force may be divided by a large contact area and thus may be small, which causes the contact resistance to be high. For example, a long OD edge surface length that results in a large contact area with the sputter pin may cause the contact force to be small and thus may cause the contact resistance to be high. A high contact resistance (e.g., greater than or equal to 50 Ohms, which may often be measured after the magnetic media is fabricated such that the disk includes the magnetic layer structure) may cause arcing that may damage the disk as discussed above.

Hence, although increasing the OD edge surface length may increase a contact area, increasing the OD edge surface length may also cause the contact force decrease, thereby causing the contact resistance to become high and consequently causing arcing and/or chipping. On the other hand, if the OD edge surface length is very small, then the OD edge surface may become sharp and thus may be susceptible to chipping. Hence, to reduce a chance of arcing and/or chipping, the OD edge surface length may be selected to be within a range that is not long enough to cause arcing and/or chipping, and not short enough to be susceptible to chipping.

Figure 5A:
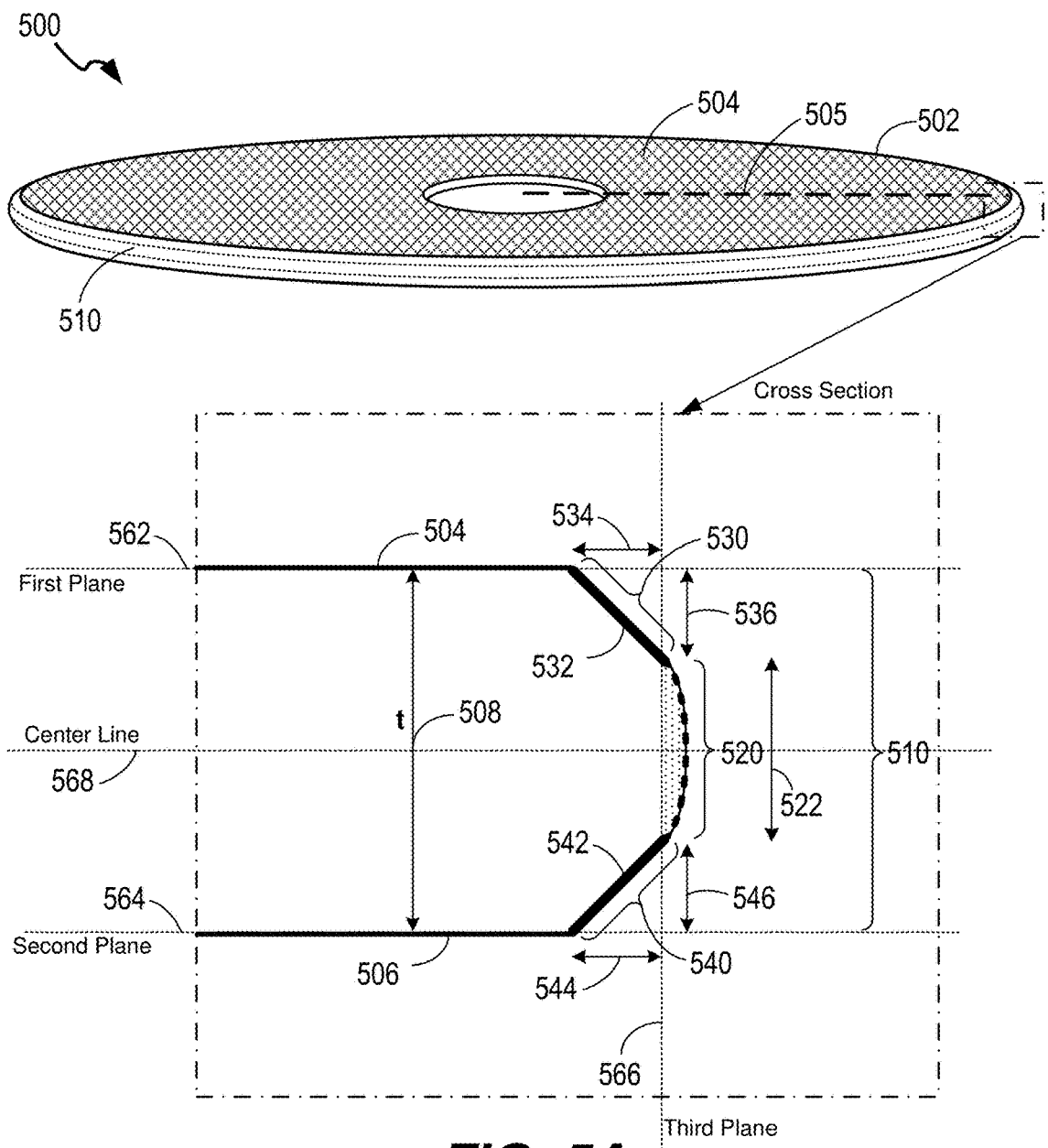
FIG. 5A illustrates an exemplary diagram showing a cross section of a portion of an OD edge of a disk for magnetic recording in accordance with aspects of the disclosure.

FIG. 5A illustrates an exemplary diagram 500 showing a cross section of a portion of an OD edge of a disk 502 for magnetic recording in accordance with aspects of the disclosure. The cross section shown in FIG. 5A may be taken along a plane perpendicular to a first surface 504 and along a diameter line 505 of the disk 502. The disk 502, which may be configured for magnetic recording, may have the first surface 504 extending along a first plane 562 and a second surface 506 extending along a second plane 564 parallel to the first plane 562. The first surface 504 may be a data surface where data may be magnetically recorded in a magnetic recording layer of the disk 502 (e.g., once it has been deposited). For example, the data may be recorded in the magnetic recording layer of the disk 502 using a recording head (e.g., recording head 108). The disk 502 may further have an OD edge 510 along a perimeter edge of the disk 502. The OD edge 510 of the disk 502 may include an edge surface 520, a first chamfer 530, and a second chamfer 540. The edge surface 520 is disposed along a perimeter of the disk 502 and between the first surface 504 and the second surface 506. The first chamfer 530 is disposed between the first surface 504 and the edge surface 520, and the second chamfer 540 is disposed between the second surface 506 and the edge surface 520. A disk thickness (t) 508 is the thickness between the first surface 504 and the second surface 506, and may be measured along a direction substantially normal to the first surface 504 or the second surface 506. In some aspects, the disk thickness may be less than or equal to 0.5 mm.

As discussed above, to reduce a chance of arcing and/or chipping, a length of the edge surface 520 may be defined to be within a range that is not long enough to cause arcing and/or chipping and is not so short to cause the edge surface 520 to be sharp. In some aspects, a length of the edge surface 520 may be between 40% and 80% of the disk thickness 508, where the length of the edge surface 520 may be measured along the direction substantially normal to the first surface 504 or the second surface 506. In some aspects, the length of the edge surface 520 may be between 50% and 70% of the disk thickness 508. In some aspects, the length of the edge surface 520 may be between 55% and 65% of the disk thickness 508.

In an aspect, a cross section of the first chamfer 530 taken along a plane perpendicular to the first surface 504 and along a diameter line (e.g., diameter line 505) of the disk 502 may include a first chamfer surface 532 between the first surface 504 and the edge surface 520 at an angle. Further, in an aspect, a cross section of the second chamfer 540 taken along a plane perpendicular to the second surface 506 and along a diameter line (e.g., diameter line 505) of the disk 502 may include a second chamfer surface 542 between the second surface 506 and the edge surface 520 at an angle. The cross-section shown in FIG. 5A is taken along the plane perpendicular to the first surface 504 and along the diameter line 505 of the disk 502, and thus shows the cross section of the first chamfer 530 taken along the plane perpendicular to the first surface 504 and along the diameter line 505 as well as the cross section of the second chamfer 540 taken along the plane perpendicular to the second surface 506 and along the diameter line 505. In this aspect of FIG. 5A, the first chamfer surface 532 and the second chamfer surface 542 may be substantially flat. Hence, in FIG. 5A, the cross section shows the first chamfer surface 532 to be a straight line at an angle from the first surface 504, and the second chamfer surface 542 to be a straight line at an angle from the second surface 506. In an aspect, the first chamfer surface 532 may be substantially at 45 degrees (e.g., about 45 degrees) from the first surface 504 and the third plane 566, and the second chamfer surface 542 may be substantially at 45 degrees (e.g., about 45 degrees) from the second surface 506 and the third plane 566. In an aspect, the first chamfer surface 532 may be at an angle ranging between about 40 degrees and about 50 degrees from the first surface 504 and the third plane 566, and the second chamfer surface 542 may be at an angle ranging between about 40 degrees and about 50 degrees from the second surface 506 and the third plane 566.

In an aspect, the first chamfer surface 532 of the first chamfer 530 has a first surface chamfer length 534 along the first plane 562 and a first edge chamfer length 536 along the third plane 566, and the second chamfer surface 542 of the second chamfer 540 has a second surface chamfer length 544 along the second plane 564 and a second edge chamfer length 546 along the third plane 566. For example, a horizontal length and a vertical length of the first chamfer surface 532 may respectively correspond to the first surface chamfer length 534 and first edge chamfer length 536, and a horizontal length and a vertical length of the second chamfer surface 542 may respectively correspond to the second surface chamfer length 544 and second edge chamfer length 546. In an aspect, the first surface chamfer length 534 may be substantially equal to the second surface chamfer length 544, and the first edge chamfer length 536 may be substantially equal to the second edge chamfer length 546.

In an aspect, the first chamfer 530 may be symmetrical to the second chamfer 540. For example, the first chamfer 530 may be symmetrical to the second chamfer 540 about a center line 568 through a center of the disk and parallel to the first surface 504, where the center line 568 has a same perpendicular distance to the first surface 504 and to the second surface 506.

Figure 5B:
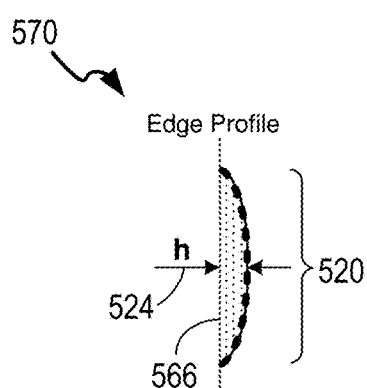
FIG. 5B illustrates an exemplary diagram showing an edge profile of the edge surface portion of the disk of FIG. 5A.

FIG. 5B illustrates an exemplary diagram 570 showing an edge profile of the edge surface 520 of the disk 502 of FIG. 5A. In some aspects, the edge surface 520 includes the edge profile with a convex/round shape such that a cross section of the edge surface 520, taken along a plane perpendicular to the first surface 504 and along the diameter line 505 of the disk 502, has the convex/round shape. As discussed above, the cross section shown in FIG. 5A is taken along the plane perpendicular to the first surface 504 and along the diameter line 505 of the disk 502. As shown in FIGS. 5A and 5B, the edge surface 520 has the edge profile with a convex/circular shape. The convex/circular shape of the edge profile of the edge surface 520 may have a chord height (h) 524. The chord height 524 of the convex shape in the edge profile may be a distance between the third plane 566 and an apex of the convex shape measured in a direction substantially parallel to the first surface 504 (or measured in a direction substantially perpendicular to the third plane 566).

In some aspects, the chord height 524 may determine a magnitude of a contact area. For example, the larger the chord height 524 is, the rounder the shape of the edge profile is, which may cause a smaller contact area. Therefore, the chord height 524 may be defined to be small enough to provide a sufficient contact area with a pin. In some aspects, the chord height 524 of the convex shape in the edge profile may be less than 10 μm (e.g., about 10 μm).

Figure 5C:
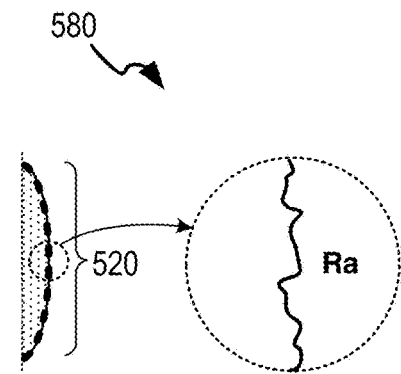
FIG. 5C illustrates an exemplary diagram showing a roughness of the edge surface of the disk of FIG. 5A.

FIG. 5C illustrates an exemplary diagram 580 showing a roughness of the edge surface 520 of the disk 502 of FIG. 5A. The edge surface 520 may not be a substantially smooth flat surface, but may have roughness and/or irregularities. As shown in FIG. 5C, a magnified view of a portion of the edge surface shows a roughness of the edge surface 520. In some aspects, a roughness parameter (Ra) for the roughness of the edge surface 520 may be 8 μm (e.g., about 8 μm).

In an example, where the disk thickness is less than or equal to 0.5 mm, if the length of the edge surface 520 is between 40% and 80% of the disk thickness 508, the chord height 524 of the convex shape in the edge profile is less than 10 μm, and the roughness parameter (Ra) for the roughness of the edge surface 520 is 8 μm, the contact resistance may be below 200 Ohms and the contact resistance may stay substantially stable for up to 500 grams of contact force. Hence, in this example, this specific condition (e.g., contact condition) may allow for a steady electrical contact in a wide range of contact forces. In an example, the contact resistance may be measured on the disk 502 with magnetic and carbon layers on top of the conductive layer.

Figure 6:
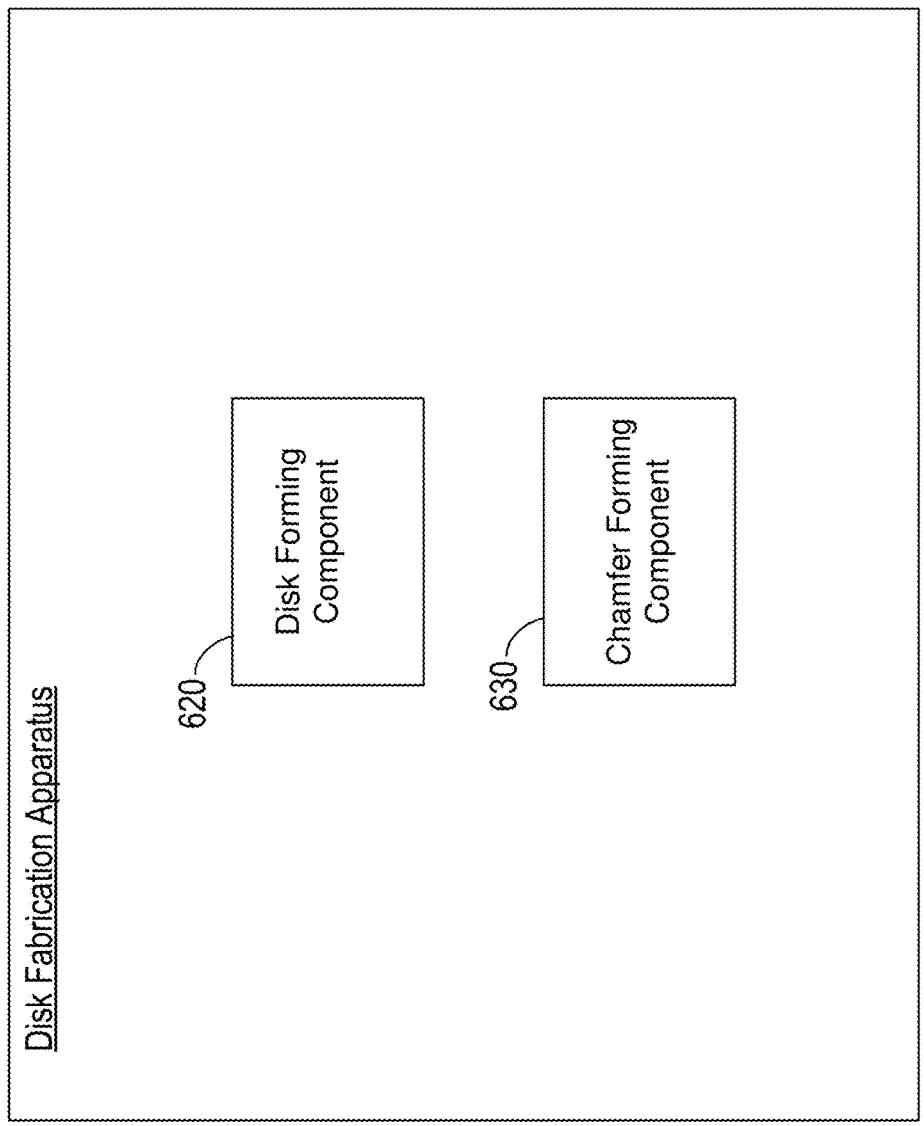
FIG. 6 illustrates an exemplary block diagram for a disk fabrication apparatus in accordance with aspects of the disclosure.

FIG. 6 illustrates an exemplary block diagram for a disk fabrication apparatus 600 in accordance with aspects of the disclosure. The disk fabrication apparatus 600 may include a disk forming component 620 configured to form a disk having a first surface extending along a first plane, a second surface extending along a second plane parallel to the first plane, and a disk thickness between the first surface and the second surface, measured along a first direction substantially normal to the first surface. The disk fabrication apparatus 600 may further include a chamfer forming component 630 configured to remove material from a first perimeter corner of the disk to form a first chamfer, and to remove material from a second perimeter corner of the disk to form a second chamfer and an edge surface disposed between the first chamfer and the second chamfer, where the edge surface is disposed and between the first surface and the second surface, wherein the edge surface extends along a third plane substantially perpendicular to the first surface. For example, the chamfer forming component 620 may control a forming tool (e.g., grinding wheel) to remove the material from the first perimeter corner of the disk to form the first chamfer, and to remove material from a second perimeter corner of the disk to form the second chamfer and the edge surface. Subsequently, for example, the chamfer forming component 630 may polish the first and second chamfers (e.g., using a brush and/or a polishing slurry) to remove roughness on the surfaces of the first and second chamfers after using the forming tool. The roughness on the surfaces of the first and second chamfers may be controlled by slurry suspension liquid chemistry, slurry particle sizes, a brush shape, applied force, etc. In an aspect, a length of the edge surface measured along the first direction is between 40% and 80% of the disk thickness. In an example, the forming tool may be a wheel (e.g., diamond wheel) with a V-shape groove and a flat bottom, where a rotating wheel may be pressed against a rotating disk in such a way that a surface of the V-shape groove contacts the first and second perimeter corners simultaneously, thereby forming the first and second chamfers simultaneously.

In one aspect, the disk forming component 620 is not included in the apparatus as blank disks are provided before the chamfers are formed. In one aspect, the disk fabrication apparatus is not needed and the specifications of the desired disk shape (e.g., size including inner diameter, outer diameter, thickness, chamfers, and edge surface length) are provided to a disk manufacturer to fabricate the disks in accordance with the specifications.

Figure 7:
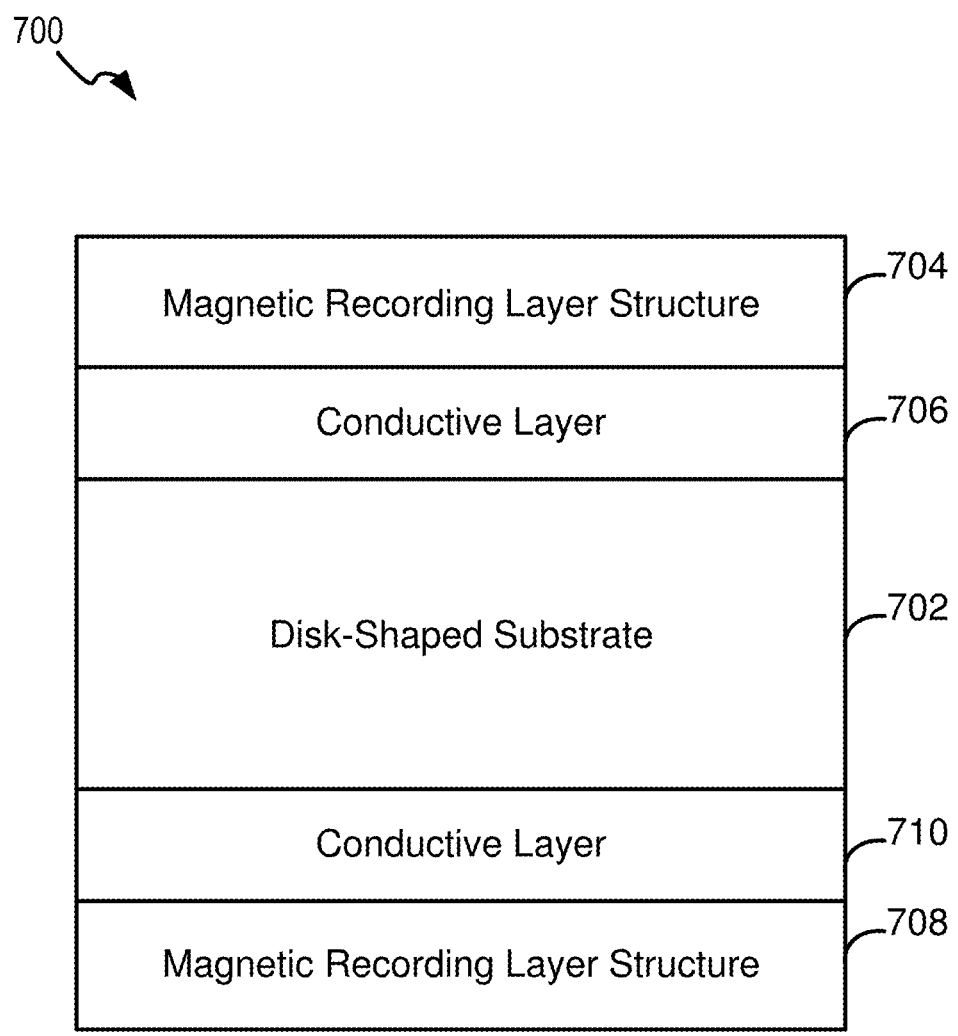
FIG. 7 illustrates, in simplified form, an exemplary magnetic recording medium, platform or structure in the form of a pre-stressed disk having a substrate formed of Al—Mg alloy.

FIG. 7 illustrates, in simplified form, an exemplary magnetic recording medium, platform or structure in the form of a disk 700 having a conductive layer 706 formed on a substrate 702. A first magnetic recording layer structure 704 is deposited on one side (e.g., the top side) of the substrate 702 above the conductive coating/layer (e.g., plating) layer 706. A second magnetic recording layer structure 708 is deposited on the other side (e.g., the bottom side) of the substrate 702 below another conductive coating/layer (plating) layer 710. As discussed above, the conductive layers, which may also function as adhesion layers, are provided on the substrate to enable subsequent deposition of other layers using bias voltage and sputter deposition. In some examples, a magnetic recording layer structure is deposited on only one side of the substrate and hence only one conductive layer/coating is provided. The first and second magnetic recording layers (e.g., 704, 708) may include, e.g., cobalt-platinum (CoPt), iron-platinum (FePt) alloy, and/or combinations thereof. For clarity and simplicity, FIG. 7 only shows a few of the layers typically included in a magnetic recording medium. Further details of an exemplary media structure may be found in U.S. patent application Ser. No. 17/361,272, entitled "HEAT ASSISTED MAGNETIC RECORDING MEDIA WITH AMORPHOUS MAGNETIC GRAIN BOUNDARY MATERIAL," filed on Jun. 28, 2021, and assigned to the assignee of the present application, and which is incorporated fully by reference herein.

Although not shown in FIG. 7, the magnetic recording layer structure 704 may include magnetic recording sub-layers and exchange control sub-layers (ECLs). Collectively, the sub-layers form a magnetic recording layer structure 704 that may be, e.g., 100-200 angstroms (Å) thick. Since both the conductive layers and the magnetic recording layer structure are both very thin (e.g., on the order of microns (μm) or Å, respectively), the thickness of the disk 700 is primarily dictated by the thickness of the substrate, e.g., 0.5 mm or less (and, e.g., in the range of 0.2 mm to 0.5 mm). Note that other coatings may be provided as well, which are also very thin and do not significantly add thickness. For example, protective layers may be deposited that include carbon, diamond-like crystal, carbon with hydrogen and/or nitrogen doping, and/or combinations thereof.

In some examples, the substrate 702 has a diameter (i.e., OD) of about 95 mm or larger (e.g., 97 mm), a thickness of 0.5 mm or less. In other examples, the OD may be 98 mm or 98.1 mm. (Generally speaking, such disks are all referred to as "3.5 inch" disks.) The substrate 702 may be made of non-conductive materials such as glass, glass ceramic, aluminum, magnesium, zinc, and/or combinations thereof.

Figure 8:
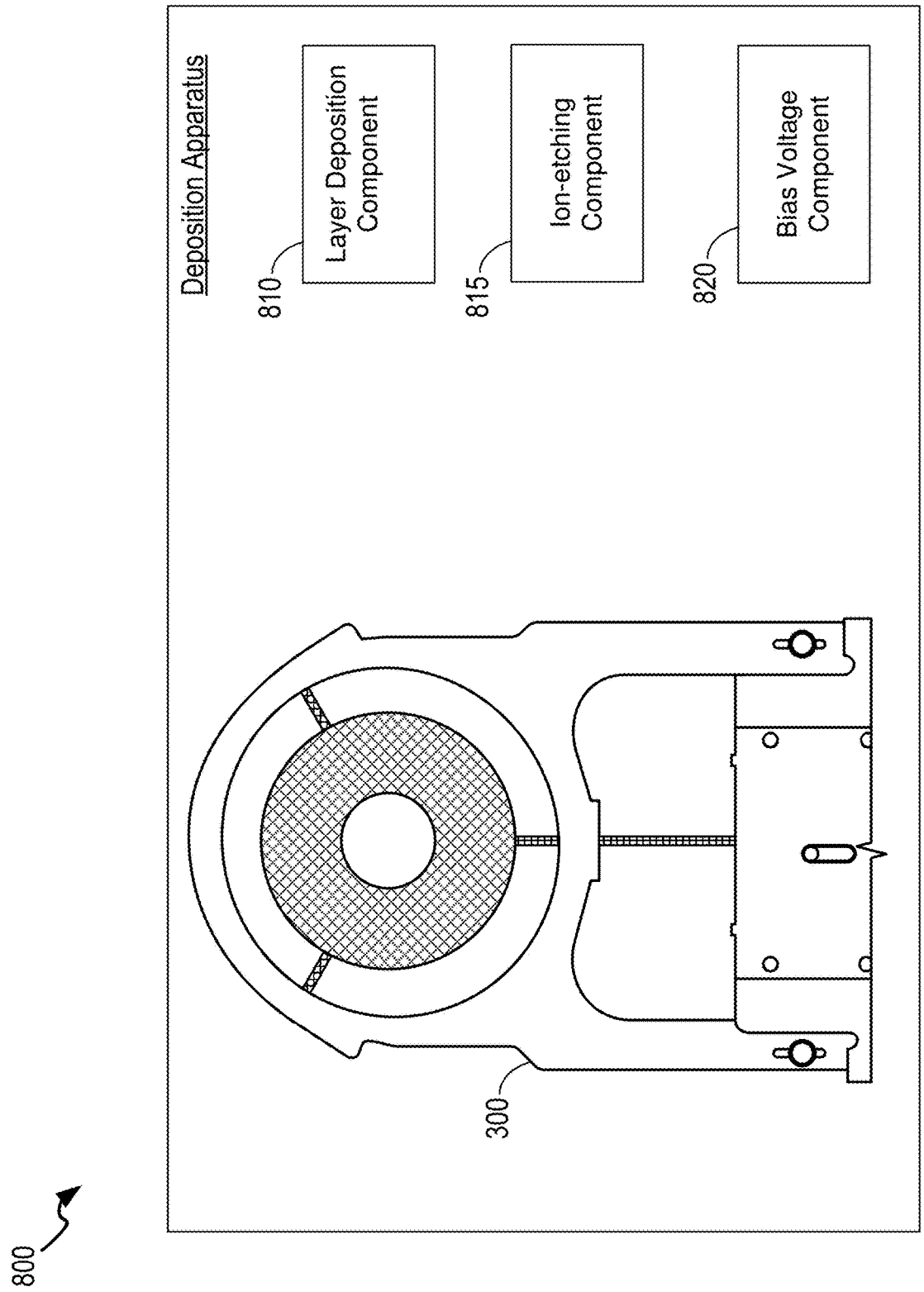
FIG. 8 illustrates an exemplary block diagram for a deposition apparatus in accordance with aspects of the disclosure.

FIG. 8 illustrates an exemplary block diagram for a deposition apparatus 800 in accordance with aspects of the disclosure. The deposition apparatus 800 may include a layer deposition component 810 configured to deposit layers (e.g., using sputter deposition) including a conductive layer and a magnetic recording layer on a disk. The deposition apparatus may further include an ion-etching component 815 configured to ion-etch the conductive layer of the disk. The deposition apparatus 800 may further include a bias voltage component 820 to apply a bias voltage to a conductive layer on the disk. For example, the deposition apparatus 800 may be used to deposit layers on substrates produced using the disk fabrication apparatus 600 to form the disk including the magnetic recording layer structure capable of magnetic recording. In an aspect, the layer deposition component 810 may deposit a conductive layer on the first surface and the edge surface of the disk, where the disk is made of one or more non-conductive materials. In an aspect, the deposition apparatus 800 may apply a bias voltage to the conductive layer. While the deposition apparatus 800 applies the bias voltage to the conductive layer, the layer deposition component 810 may deposit one or more layers (e.g., magnetic recording layers) on the conductive layer of the disk. In an example, the deposition apparatus 800 may include the disk carrier 830 (e.g., disk carrier 300 of FIG. 3) that can hold the disk using one or more pins, while the layer deposition component 810 deposits the layers on the disk and the deposition apparatus 800 applies the bias voltage to the conductive layer of the disk using the one or more pins.

Figure 9:
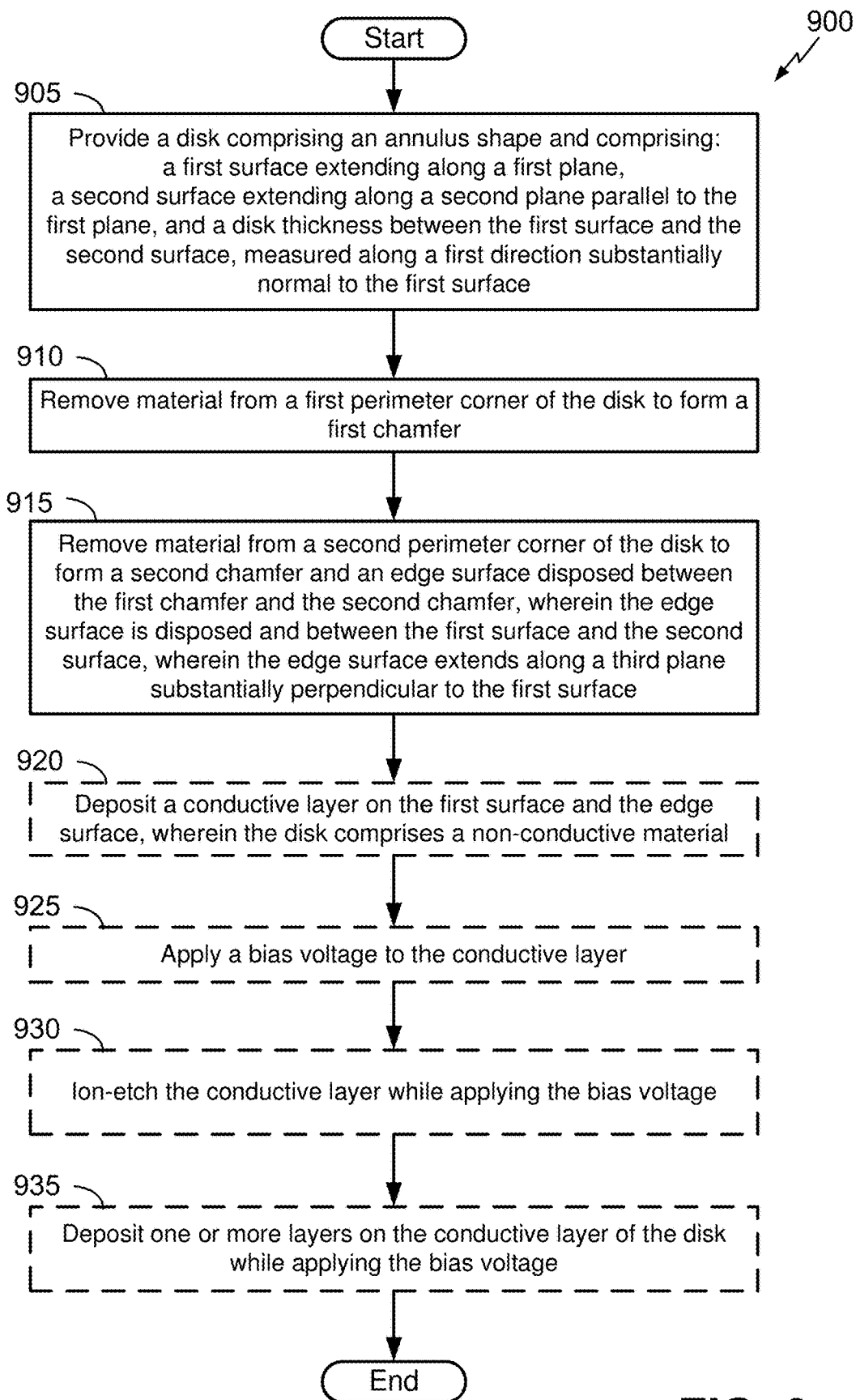
FIG. 9 illustrates a method for fabricating a disk for a magnetic recording apparatus in accordance with aspects of the disclosure.

FIG. 9 illustrates a method 900 for fabricating a disk for a magnetic recording apparatus in accordance with aspects of the disclosure. At block 905, a disk fabrication apparatus (e.g., disk forming component 610 of the disk fabrication apparatus 600) may provide a disk having an annulus shape and a first surface extending along a first plane, a second surface extending along a second plane parallel to the first plane, and a disk thickness between the first surface and the second surface, measured along a first direction substantially normal to the first surface. At block 910, the disk fabrication apparatus (e.g., chamfer forming component 630 of the disk fabrication apparatus 600) may remove material from a first perimeter corner of the disk to form a first chamfer. At block 915, the disk fabrication apparatus (e.g., chamfer forming component 630 of the disk fabrication apparatus 600) may remove material from a second perimeter corner of the disk to form a second chamfer and an edge surface disposed between the first chamfer and the second chamfer, where the edge surface is disposed and between the first surface and the second surface, wherein the edge surface extends along a third plane substantially perpendicular to the first surface. In an aspect, a length of the edge surface measured along the first direction is between 40% and 80% of the disk thickness. In an aspect, the disk thickness may be less than or equal to 0.5 mm.

In an aspect, the edge surface may include an edge profile with a convex shape such that a cross section of the edge surface, taken along a plane perpendicular to the first surface and along a diameter line of the disk, may include the convex shape. In an aspect, a chord height of the convex shape may be less than 10 μm.

In an aspect, at block 920, a deposition apparatus (e.g., layer deposition component 810 of the deposition apparatus 800) may deposit a conductive layer on the first surface and the edge surface, wherein the disk consists of one or more non-conductive materials.

In an aspect, at block 925, the deposition apparatus (e.g., bias voltage component 820 of the deposition apparatus 800) may apply a bias voltage to the conductive layer.

In an aspect, at block 930, the ion-etching apparatus component 815 of the deposition apparatus 800 may ion-etch the conductive layer while applying the bias voltage.

In an aspect, at block 935, the deposition apparatus (e.g., layer deposition component 810 of the deposition apparatus 800) may deposit one or more layers on the conductive layer of the disk while the bias voltage is applied (e.g., by the bias voltage component 820 of the deposition apparatus 800).

Figure 10A:
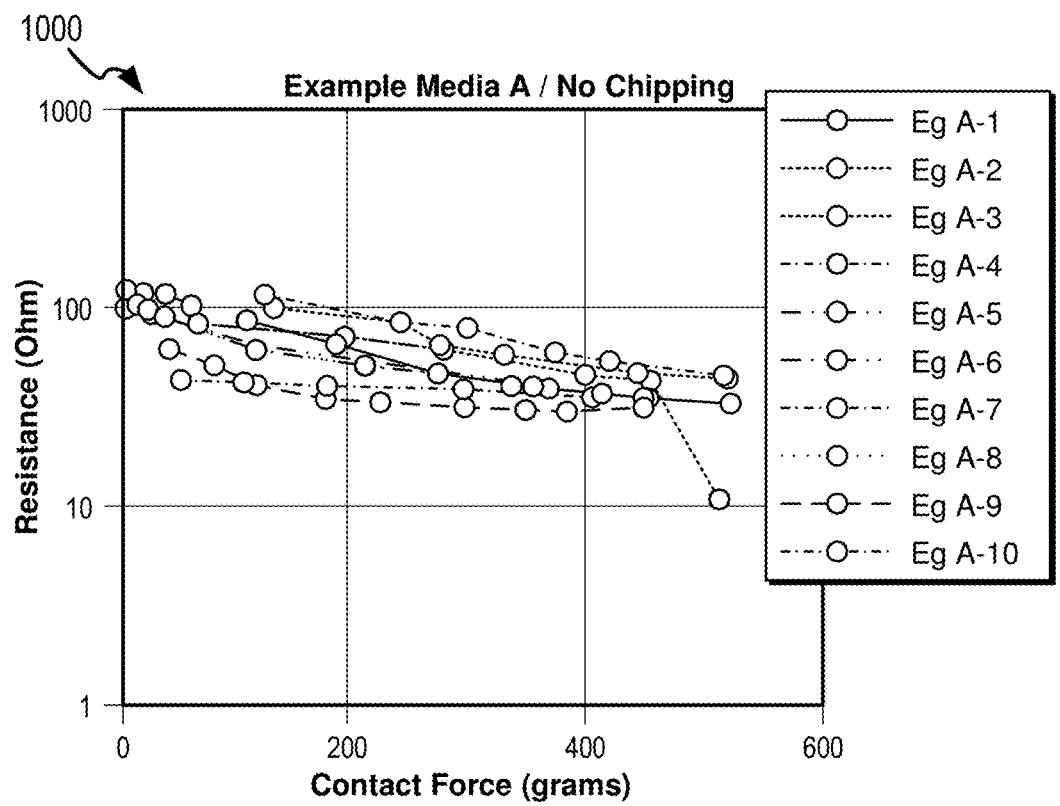
FIGS. 10A-10D show exemplary data plots illustrating the relationship between a contact resistance and a contact force, for various materials for a disk substrate, in accordance with aspects of the disclosure.

FIGS. 10A-10D show exemplary data plots illustrating the relationship between a contact resistance and a contact force, for various materials for a disk substrate, in accordance with aspects of the disclosure. FIG. 10A is an exemplary data plot 1000 illustrating the relationship between a contact resistance and a contact force when a first example substrate, Glass Media Example A, is used as a disk substrate. As shown in FIG. 10A, 10 iterations of experiments show that a contact resistance decreases as a contact force increases. In the experiment that produced the data plots of FIG. 10A, an optimal setting for depositing layers on the disk substrate was used. For example, the optimal setting may include a high bias voltage (e.g., 150V or higher). However, the disk substrate of Glass Media Example A does not exhibit any arcing or chipping. As shown in FIG. 10A, the contact resistance stayed low, around 100 Ohms or lower, thereby reducing a chance of arcing or chipping.

Figure 10B:
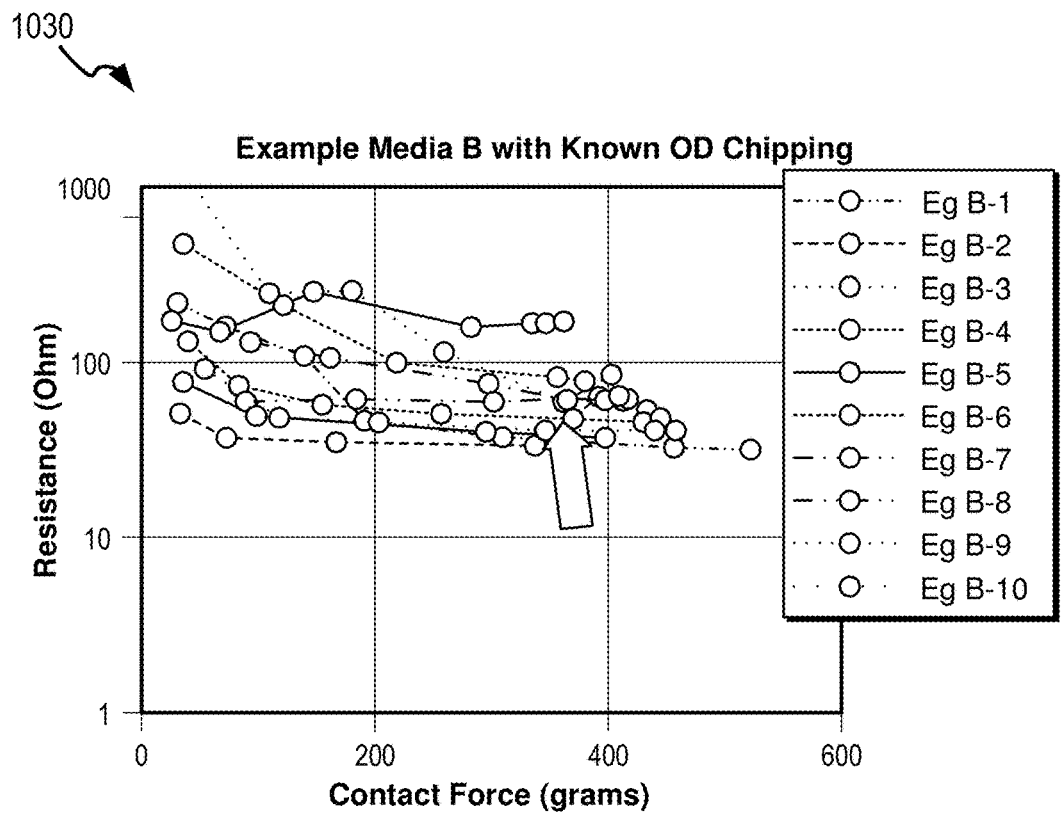

FIG. 10B is an exemplary data plot 1030 illustrating the relationship between a contact resistance and a contact force when a second example substrate, Glass Media Example B, is used as a disk substrate. As shown in FIG. 10B, 10 iterations of experiments show that a contact resistance generally decreases as a contact force increases. In the experiment that produced the data plots of FIG. 10B, an optimal setting (e.g., high bias voltage) for depositing layers on the disk substrate was used. When the high bias voltage was used, the experiments with the Glass Media Example B disk substrate showed relatively high resistance much greater than 100 Ohms, and exhibited arcing and/or chipping. Further, as indicated by an arrow, one of the experiments showed a contact resistance increasing when the contact force is between 300 and 400 grams.

Figure 10C:
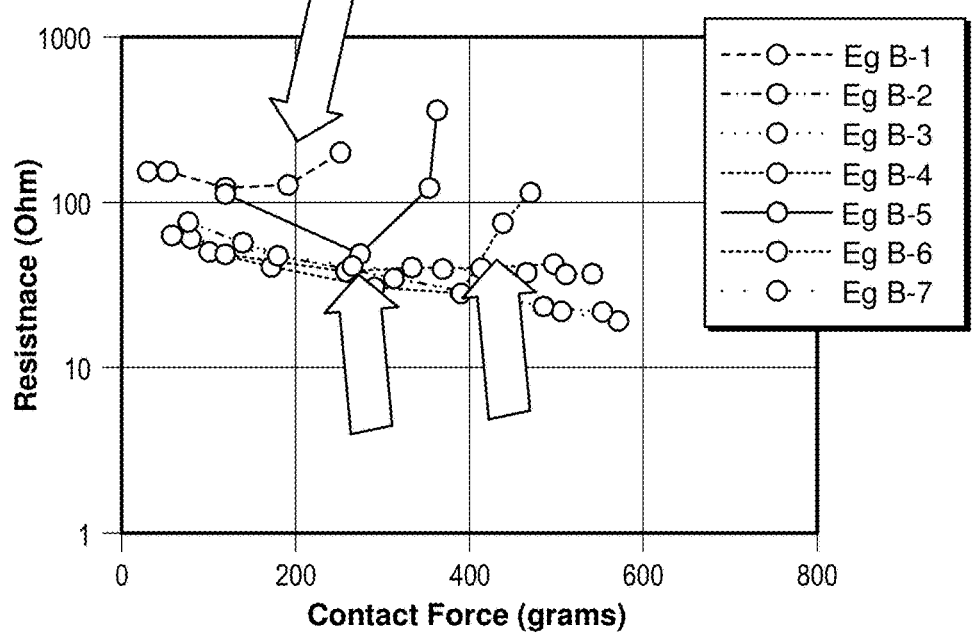

FIG. 10C is an exemplary data plot 1050 illustrating the relationship between a contact resistance and a contact force when Glass Media Example B is used as a disk substrate. As shown in FIG. 10C, 7 iterations of experiments show that a contact resistance decreases as a contact force increases for at least 5 of the 7 experiments. Unlike FIG. 10B, the experiment that produced the data plots of FIG. 10C used a lower bias voltage than the optimal setting for depositing layers on the disk substrate. By lowering the bias voltage, the experiments with the Glass Media Example B disk substrate mostly showed a low resistance around 100 Ohms or lower, and arcing and chipping on the Glass Media Example B disk substrate was avoided. However, as indicated by three arrows, some of the experiments showed a contact resistance increasing drastically at three different occasions as the contact force was increased beyond 200 grams.

Figure 10D:
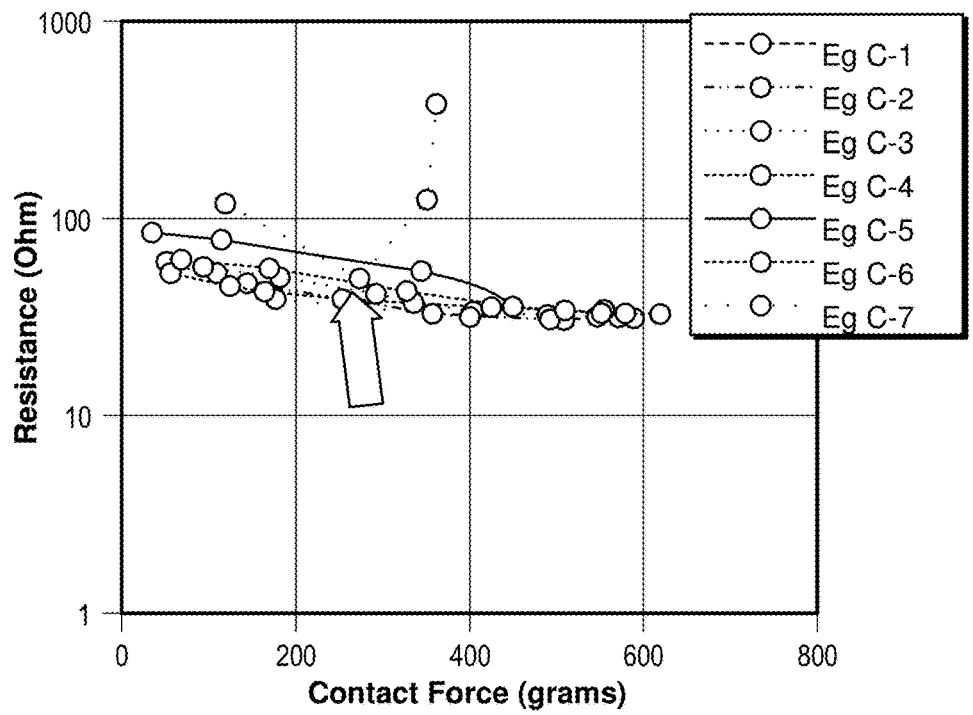

FIG. 10D is an exemplary data plot 1000 illustrating the relationship between a contact resistance and a contact force when a third example substrate, Glass Media Example C, is used as a disk substrate. As shown in FIG. 10D, 7 iterations of experiments show that a contact resistance decreases as a contact force increases, except for one of the experiments. The experiment that produced the data plots of FIG. 10D used a lower bias voltage than the optimal setting, and thus the experiments with the Glass Media Example C disk substrate mostly showed a low resistance around 100 Ohms or lower, and arcing and chipping on the Glass Media Example C disk substrate was avoided. However, one experiment shows that the contact resistance increased drastically when the contact force is greater than 200 grams, as shown by an arrow.

The experimental results of FIGS. 10A-10D provide that a contact resistance decreases as a contact force increases, and thus is inversely proportional to the contact force. Further, as the arrows show the drastic increases in the contact resistances, the contact conditions between a sputter pin and a disk OD edge are less stable when the Glass Media Example B substrate or the Glass Media Example C substrate is used than when the Glass Media Example A substrate is used. Therefore, a disk substrate needs to be carefully selected to reduce a chance of arcing or chipping.

It shall be appreciated by those skilled in the art in view of the present disclosure that although various exemplary fabrication methods are discussed herein with reference to magnetic recording disks, the methods, with or without some modifications, may be used for fabricating other types of recording disks, for example, optical recording disks such as a compact disc (CD) and a digital-versatile-disk (DVD), or magneto-optical recording disks, or ferroelectric data storage devices.

Various components described in this specification may be described as "including" or made of certain materials or compositions of materials. In one aspect, this can mean that the component consists of the particular material(s). In another aspect, this can mean that the component comprises the particular material(s).

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. It is further noted that the term "over" as used in the present application in the context of one component located over another component, may be used to mean a component that is on another component and/or in another component (e.g., on a surface of a component or embedded in a component). Thus, for example, a first component that is over the second component may mean that (1) the first component is over the second component, but not directly touching the second component, (2) the first component is on (e.g., on a surface of) the second component, and/or (3) the first component is in (e.g., embedded in) the second component. The term "about 'value X'", or "approximately value X", as used in the disclosure shall mean within 10 percent of the 'value X'. For example, a value of about 1 or approximately 1, would mean a value in a range of 0.9-1.1. In the disclosure various ranges in values may be specified, described and/or claimed. It is noted that any time a range is specified, described and/or claimed in the specification and/or claim, it is meant to include the endpoints (at least in one embodiment). In another embodiment, the range may not include the endpoints of the range.

What is claimed is:

1. A magnetic recording disk, the disk comprising:
   a first surface extending along a first plane;
   a second surface extending along a second plane parallel to the first plane;
   a disk thickness between the first surface and the second surface, measured along a first direction substantially normal to the first surface;
   an edge surface disposed along a perimeter of the disk and between the first surface and the second surface, wherein the edge surface extends along a third plane substantially perpendicular to the first surface;
   a first chamfer disposed between the first surface and the edge surface; and
   a second chamfer disposed between the second surface and the edge surface,
   wherein a length of the edge surface measured along the first direction is between 40% and 80% of the disk thickness, and
   wherein the edge surface comprises an edge profile with a convex shape such that a cross section of the edge surface, taken along a plane perpendicular to the first surface and along a diameter line of the disk, comprises the convex shape without a flat portion.

2. The disk of claim 1, wherein the disk thickness is less than or equal to 0.5 mm.

3. The disk of claim 1, wherein a chord height of the convex shape is less than 10 µm.

4. The disk of claim 1, wherein a roughness parameter for the edge surface is less than 8 µm.

5. The disk of claim 1, wherein a cross section of the first chamfer taken along a plane perpendicular to the first surface and along a diameter line of the disk comprises a first chamfer surface between the first surface and the edge surface at an angle, and a cross section of the second chamfer taken along a plane perpendicular to the second surface and along a diameter line of the disk comprises a second chamfer surface between the second surface and the edge surface at an angle.

6. The disk of claim 5, where the first chamfer surface and the second chamfer surface are substantially flat.

7. The disk of claim 5, wherein the first chamfer surface of the first chamfer has a first surface chamfer length along the first plane and a first edge chamfer length along the third plane, and the second chamfer surface of the second chamfer has a second surface chamfer length along the second plane and a second edge chamfer length along the third plane, and
   wherein the first surface chamfer length is substantially equal to the second surface chamfer length, and the first edge chamfer length is substantially equal to the second edge chamfer length.

8. The disk of claim 5, wherein the first chamfer surface is at an angle ranging between about 40 degrees and about 50 degrees from the first surface and the third plane, and the second chamfer surface is at an angle ranging between about 40 degrees and about 50 degrees from the second surface and the third plane.

9. The disk of claim 1, wherein the first chamfer is symmetrical to the second chamfer.

10. A deposition apparatus comprising:
    the disk of claim 1;
    one or more contact pins having an electrical contact with the edge surface of the disk; and
    a bias voltage power supply configured to apply a voltage to the one or more contact pins during at least one of a deposition process for depositing one or more layers on the disk or an ion-etching process for etching the disk.

11. The deposition apparatus of claim 10, further comprising:
    a disk carrier comprising:
       a carrier body; and
       the one or more contact pins comprising at least three contact pins disposed between the carrier body and the edge surface of the disk, wherein the at least three contact pins secure the disk within the disk carrier for the deposition process;
    wherein the disk carrier is electrically coupled to the bias voltage power supply.

12. A data storage device comprising:
    the disk of claim 1, the disk further comprising a magnetic recording layer; and
    a slider comprising a magnetic head;
    wherein the slider is configured to write information to the magnetic recording layer of the disk.

13. The disk of claim 1, wherein the length of the edge surface measured along the first direction is between 50% and 70% of the disk thickness.

14. The disk of claim 1, wherein the length of the edge surface measured along the first direction is between 55% and 65% of the disk thickness.

15. The disk of claim 1, wherein the edge surface comprises the edge profile with the convex shape such that the cross section of the edge surface, taken along the plane perpendicular to the first surface and along the diameter line of the disk, consists of the convex shape without a flat portion.

16. A magnetic recording disk, the disk comprising:
a first surface extending along a first plane;
a second surface extending along a second plane parallel to the first plane;
a disk thickness between the first surface and the second surface, measured along a first direction substantially normal to the first surface;
an edge surface disposed along a perimeter of the disk and between the first surface and the second surface, wherein the edge surface extends along a third plane substantially perpendicular to the first surface;
a conductive layer disposed on the first surface and the edge surface;
a first chamfer disposed between the first surface and the edge surface; and
a second chamfer disposed between the second surface and the edge surface,
wherein a length of the edge surface measured along the first direction is between 40% and 80% of the disk thickness,
wherein the disk comprises a non-conductive material, and
wherein a contact resistance between the edge surface and a point on the first surface is below 200 Ohms.

17. The disk of claim 16, wherein the non-conductive material includes at least one of a glass material or a glass ceramic material.

18. A method of fabricating a disk for a magnetic recording apparatus, the method comprising:
providing a disk comprising an annulus shape and comprising:
a first surface extending along a first plane;
a second surface extending along a second plane parallel to the first plane; and
a disk thickness between the first surface and the second surface, measured along a first direction substantially normal to the first surface;
removing material from a first perimeter corner of the disk to form a first chamfer; and
removing material from a second perimeter corner of the disk to form a second chamfer and an edge surface disposed between the first chamfer and the second chamfer, wherein the edge surface is disposed and between the first surface and the second surface, wherein the edge surface extends along a third plane substantially perpendicular to the first surface, wherein a length of the edge surface measured along the first direction is between 40% and 80% of the disk thickness, and
wherein the edge surface comprises an edge profile with a convex shape such that a cross section of the edge surface, taken along a plane perpendicular to the first surface and along a diameter line of the disk, comprises the convex shape without a flat portion.

19. The method of claim 18, wherein the disk thickness is less than or equal to 0.5 mm.

20. The method of claim 18, further comprising:
depositing a conductive layer on the first surface and the edge surface, wherein the disk consists of one or more non-conductive materials; and
applying a bias voltage to the conductive layer,
wherein the method further comprises at least one of:
ion-etching the conductive layer while applying the bias voltage; or
depositing one or more layers on the conductive layer of the disk while applying the bias voltage.

21. The method of claim 20, wherein the one or more layers comprises a magnetic recording layer.

22. The method of claim 18, wherein the edge surface comprises the edge profile with the convex shape such that the cross section of the edge surface, taken along the plane perpendicular to the first surface and along the diameter line of the disk, consists of the convex shape without a flat portion.

23. A magnetic recording disk substrate, the disk substrate comprising:
a first surface extending along a first plane;
a second surface extending along a second plane parallel to the first plane;
a disk substrate thickness between the first surface and the second surface, measured along a first direction substantially normal to the first surface;
an edge surface disposed along a perimeter of the disk substrate and between the first surface and the second surface, wherein the edge surface extends along a third plane substantially perpendicular to the first surface;
a first chamfer disposed between the first surface and the edge surface; and
a second chamfer disposed between the second surface and the edge surface,
wherein a length of the edge surface measured along the first direction is between 40% and 80% of the disk substrate thickness, and
wherein the edge surface comprises an edge profile with a convex shape such that a cross section of the edge surface, taken along a plane perpendicular to the first surface and along a diameter line of the disk, comprises the convex shape without a flat portion.

24. The disk substrate of claim 23, wherein the disk substrate thickness is less than or equal to 0.5 mm.

25. The disk substrate of claim 23, wherein a chord height of the convex shape is less than 10 μm.

26. The disk substrate of claim 23, wherein a roughness parameter for the edge surface is less than 8 μm.

27. The disk substrate of claim 23, wherein a cross section of the first chamfer taken along a plane perpendicular to the first surface and along a diameter line of the disk substrate comprises a first chamfer surface between the first surface and the edge surface at an angle, and a cross section of the second chamfer taken along a plane perpendicular to the second surface and along a diameter line of the disk substrate comprises a second chamfer surface between the second surface and the edge surface at an angle.

28. The disk substrate of claim 27, where the first chamfer surface and the second chamfer surface are substantially flat.

29. The disk substrate of claim 27, wherein the first chamfer surface of the first chamfer has a first surface chamfer length along the first plane and a first edge chamfer length along the third plane, and the second chamfer surface of the second chamfer has a second surface chamfer length along the second plane and a second edge chamfer length along the third plane, and
wherein the first surface chamfer length is substantially equal to the second surface chamfer length, and the first edge chamfer length is substantially equal to the second edge chamfer length.

30. The disk substrate of claim 27, wherein the first chamfer surface is at an angle ranging between about 40 degrees and about 50 degrees from the first surface and the third plane, and the second chamfer surface is at an angle ranging between about 40 degrees and about 50 degrees from the second surface and the third plane.

31. The disk substrate of claim 23, wherein the first chamfer is symmetrical to the second chamfer.

32. A magnetic recording disk, the disk comprising:
the disk substrate of claim 23; and
a conductive layer disposed on the first surface and the edge surface of the disk substrate,
wherein the disk substrate comprises a non-conductive material; and
wherein a contact resistance between the edge surface and a point on the first surface is below 200 Ohms.

33. The disk of claim 32, wherein the non-conductive material includes at least one of a glass material or a glass ceramic material.

34. The disk substrate of claim 23, wherein the length of the edge surface measured along the first direction is between 50% and 70% of the disk substrate thickness.

35. The disk substrate of claim 23, wherein the length of the edge surface measured along the first direction is between 55% and 65% of the disk substrate thickness.

36. The disk substrate of claim 23, wherein the edge surface comprises the edge profile with the convex shape such that the cross section of the edge surface, taken along the plane perpendicular to the first surface and along the diameter line of the disk, consists of the convex shape without a flat portion.

\* \* \* \* \*